United States Patent [19]

Ariura

[11] Patent Number: 5,030,038
[45] Date of Patent: Jul. 9, 1991

[54] HOBBING TOOL FOR FINISHING GEARS

[75] Inventor: Yasutsune Ariura, Fukuoka, Japan

[73] Assignees: Sumitomo Electric Industries, Ltd., Osaka; Komatsu, Ltd., Tokyo; Azumi, Ltd., Osaka, all of Japan

[21] Appl. No.: 421,236

[22] Filed: Oct. 16, 1989

[30] Foreign Application Priority Data

Oct. 17, 1988 [JP] Japan .................... 63-262082

[51] Int. Cl.⁵ .................................. B23F 21/16
[52] U.S. Cl. ............................ 407/26; 407/119; 419/13; 419/16; 75/230; 75/241; 428/552
[58] Field of Search ............... 407/119, 23, 24, 25, 407/26; 419/10, 15, 14, 16, 23, 33, 39, 60, 13, 12, 17; 75/230, 241, 242, 244, 237, 238, 233, 235, 248, 234; 51/309; 428/552, 551; 501/96; 409/11

[56] References Cited

U.S. PATENT DOCUMENTS

| | | |
|---|---|---|
| 4,022,584 | 5/1977 | Rudy .................... 75/234 |
| 4,049,876 | 9/1977 | Yamamoto .............. 75/238 |
| 4,492,764 | 1/1985 | Watanabe ............... 501/96 |
| 4,574,607 | 3/1986 | Akino .................... 72/112 |
| 4,587,095 | 5/1986 | Yoshimura et al. ....... 75/238 |
| 4,587,174 | 5/1986 | Yoshimura et al. ....... 75/235 |
| 4,647,546 | 3/1987 | Hall ..................... 51/309 |
| 4,769,070 | 9/1988 | Tobioka ................. 75/238 |
| 4,778,521 | 10/1988 | Iyori .................... 75/237 |
| 4,904,445 | 2/1990 | Iyori .................... 75/244 |
| 4,942,097 | 7/1990 | Santhanam et al. ...... 75/230 |

Primary Examiner—Frederick R. Schmidt
Assistant Examiner—Blynn Shideler
Attorney, Agent, or Firm—Armstrong, Nikaido, Marmelstein, Kubovcik & Murray

[57] ABSTRACT

A hobbing tool made of cermet composed of 70 to 97 percent by weight of hard phase and a binder phase. The hard phase is made of a composite carbonitride of transition metals including titanium and tungsten, and at least one other element. The binder phase contains nickel and/or cobalt and inevitable impurities. The ratio between nitride atoms and carbon atoms and the ratio between titanium atoms and the atoms of transition metals other than titanium in the hard phase should be within specific ranges. The cermet having the above composition has an increased toughness and an excellent resistance to heat and wear and is difficult to weld.

2 Claims, 3 Drawing Sheets

HOBBING TOOL FOR FINISHING GEARS

The present invention relates to a hobbing tool for finishing the tooth bottom and the tooth surface of a gear produced by generate gear cutting, to a highly smooth finish.

A prior art hob for finishing a generated gear is usually made of high-speed steel. But, because of insufficient resistance to wear and to weld, its use has been limited to the machining of a relatively soft material having an HB (Brinell hardness number) of no more than 200. Further, this type of prior art hob cannot finish up the surface of even such a low-hardness material but can machine it only to such an extent as to require further finishing work by another tool.

Also, with a hobbing tool, it is customary to form its cutting edges with a relief angle of 3 to 4 degrees to improve the properties of a finished surface. Such cutting edges having a relief angle are inevitably subject to a subtle change in shape by re-grinding. The cutting edges thus deformed will have bad effects on the shape of teeth on the gear machined. In order to prevent this, it has been proposed to form each relief surface with a flat land in a very narrow area. But, a cutting edge made of high-speed steel and having a flat land tends to be blunt and to weld to the material being machined. This makes it difficult to achieve a good finished surface. Thus the application of such a tool is limited only to a material which is easy to machine and difficult to weld.

In recent years, a hob made of cemented carbide is coming into wide use because it is superior to high-speed steel in the resistance to wear and resistance to weld. But the surface roughness obtainable with a cutting edge made of cemented carbide is about 6 microns, which is a little better than the surface roughness obtainable with a cutting edge made of high-speed steel i.e. about 10 to 20 microns, but is not sufficient to achieve a surface roughness at which no further finishing is necessary, about 2 to 3 microns.

It is an object of the present invention to provide an improved hobbing tool which obviates the abovesaid shortcomings.

In accordance with the present invention, there is provided a hobbing tool for finishing gears which has a cutting edge made of a cermet comprising 70 to 97 percent by weight of a hard phase, the balance being a binder phase. The hard phase comprises a composite carbonitride including titanium and tungsten and at least one transition metal selected from the group consisting of zirconium, hafnium, vanadium, niobium, tantalum, chromium and molybdenum. The binder phase comprises nickel and/or cobalt and inevitable impurities.

The ratio between nitrogen atoms and carbon atoms, that is, $N/(C+N)$, and the ratio between titanium atoms and atoms of a transition metal other than titanium in the hard phase, that is, $M/(Ti+M)$, should meet one of the following conditions;

(a) $N/(C+N)$ is 0.2 to 0.6 whereas $M/(Ti+M)$ is 0.05 to 0.4

(b) $N/(C+N)$ is 0.05 to 0.25 whereas $M/(Ti+M)$ is 0.4 to 0.6

The cermet according to the present invention may be made from carbides such as TiC, TaC, NbC and WC, nitrides such as TiN, carbonitrides such as TiCN, and cobalt and nickel by powdered metal technique, or may be made from a solid solution made from some or all of such starting materials by solution treatment. With either methods, similar effects can be achieved.

In order to protect the cutting edge from deformation by re-grinding and to prevent it from chipping, it should be formed on the flank with a flat land extending in the direction of rotation of a gear.

With the hob according to the present invention, the work can be machined at a speed 3 to 5 times higher than with a prior art hob made of high-speed steel. Also its service life is about ten times longer than that of the prior art hob. The efficiency of generate gear cutting improves dramatically because no additional finishing is necessary and the work can be machined at an increased speed. The high machining efficiency as well as longer service life will make it possible to sharply cut down the machining cost and the production cost.

Further, since rough cutting as well as finish cutting is possible with a single hobbing machine, the equipment cost can be reduced and the working process can be simplified.

Other features and objects of the present invention will become apparent from the following description taken with reference to the accompanying drawings, in which.

Figure 1:
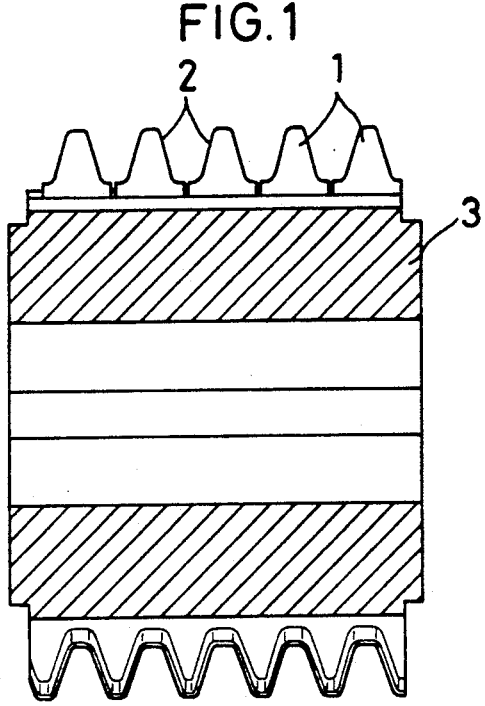
FIG. 1 is a sectional view of the hobbing tool embodying the present invention.

A cutting edge made of cermet, which has an excellent antiweld property against iron, can produce a finer finished surface than the one produced by a cutting edge made of high-speed steel or cemented carbide.

It also has an excellent antiwear property and thus can withstand a long use even if it is used for the machining of a relatively hard material.

Cermet has a fine grain size, an increased hardness and a high heat resistance, which are highly desirable characteristics as the material for a cutting edge. In spite of its favorable characteristics, cermet has never been used as the material for a hobbing tool. This is because any prior art cermet provided for ordinary light machining was extremely poor in strength as well as toughness. In fact, it was observed that a hob made of such a prior art cermet broke too early to exhibit its excellent characteristics as described above.

In contrast, a hob made of the cermet according to the present invention having the above-described composition was found out to withstand a practical use. Thus the surface of a work can be finished to such an extent as to require no further grinding (roughness of 2-3 microns) with such a hob by virtue of the above-mentioned characteristics of cermet. The hobbing tool formed with a flat land on the relief surface of each cutting edge is less liable to have bad effects on the gear being machined and the flat lands serve to increase the rigidity of the cutting edges, thus preventing them form chipping This will lead to an extention of the service life of the machine tool. The provision of the flat land on each relief surface will not lead to the blunting of the edges or promote welding, because the edges are made of the cermet having an increased rigidity and an excellent antiweld property.

The cermet according to the present invention should have the abovesaid limitations in the contents of its ingredients.

The content of the hard phase in the cermet should be 70 to 97 percent by weight. If it is less than 70 percent by weight, the heat resistance, antiwear property and antiweld property of the cermet will be insufficient, whereas if it is more than 97 percent by weight, the cermet will be short of toughness.

The ratio between the nitrogen atoms and the carbon atoms, N/(C+N), and the ratio between the titanium atoms and the atoms of transition metals M other than the titanium contained in the hard phase, i.e. M/(Ti+M) should be, either:

(a) N/(C+N)=0.2−0.6 and M/(Ti+M)=0.05−0.4, or:

(b) N/(C+N)=0.05−0.25 and M/(Ti+M)=0.4−0.6.

If N/(C+N) is less than 0.2, while M/(Ti+M) is within the range of 0.05-0.4 (the prior art cermet has such a composition), the toughness will be insufficient. A hob made of such a cermet tends to suffer chipping of its cutting edges. On the other hand, any cermet having the N/(C+N) ratio of more than 0.6 would be very difficult to work.

As long as M/(Ti+M) is more than 0.4, the cermet will exhibit a sufficient toughness for actual use even if N/(C+N) is 0.05-0.25. But, if M/(Ti+M) is higher than 0.6, the antiweld property will worsen.

Speaking of tools taken up in the present invention, their field of application is expanding with the advancement of the machining capacity of the tool itself and other related techniques. Such advancement of techniques has produced an increasing demand for a cermet hob which can generate a fine surface equivalent in roughness to a ground surface not by grinding but simply by cutting. But such a demand has not been satisfied because cermet has some unfavorable characteristics. The cermet according to the present invention has a novel composition which is entirely different from any conventional cermet and is free of such unfavorable characteristics.

Figure 2:
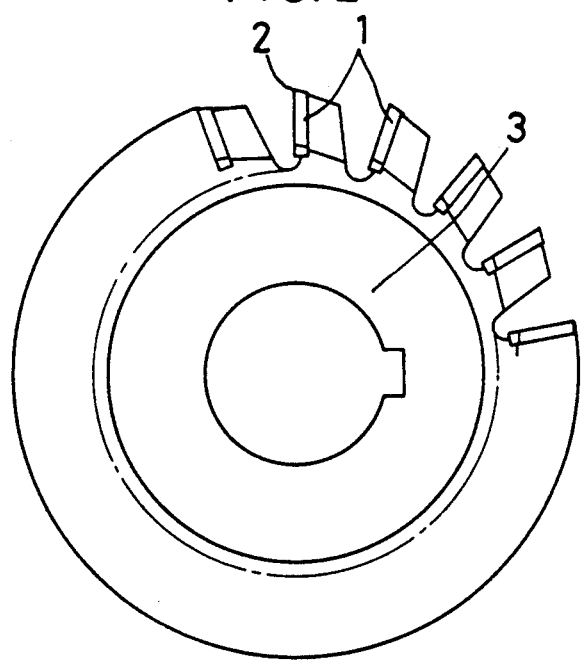
FIG. 2 is a side view of a portion of the same.
Figure 3:
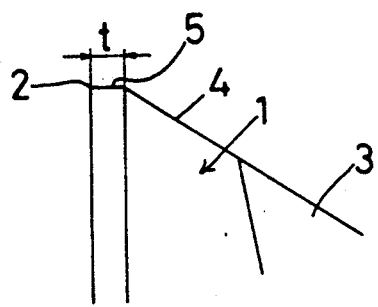
FIG. 3 is an enlarged side view of the tip of one of the cutting edges.

FIGS. 1 to 3 show the embodiment of the present invention which comprises a cutting insert 1 having cutting edges 2 and a hob body 3.

The insert 1 is made of the cermet having the above-described composition and brazed to the body 3. As shown in FIG. 3, the insert 1 has a relief surface 4 formed with a narrow flat land 5. The dimension t of the flat land 5 in the direction of threads should be as large as possible to increase the rigidity of the edge and to allow repeated regrinding. But it should not be so large that the rear end of the land 5 with respect to the direction of rotation of the hob would interfere with the material being machined. It should be from 0.2 to 1.0 mm.

Next we shall describe the results of experiments conducted to check the effects of the present invention.

EXPERIMENT I

An alloy steel SCM435 (having an HB of 340) was machined by use of the cermet hob according to the present invention, a hob made of cermet having a conventional composition, a hob made of cemented carbide JIS P25 and a hob made of high-speed steel JIS SKH 5.

Table 1 shows the measurements of the hobs used in this experiment and the cutting conditions. Table 2 shows the measurements of the gear machined. Table 3 shows the composition of the cermets used in this experiment. The cermet hob according to the present invention has the same measurements as the prior art cermet hob.

Figure 4:
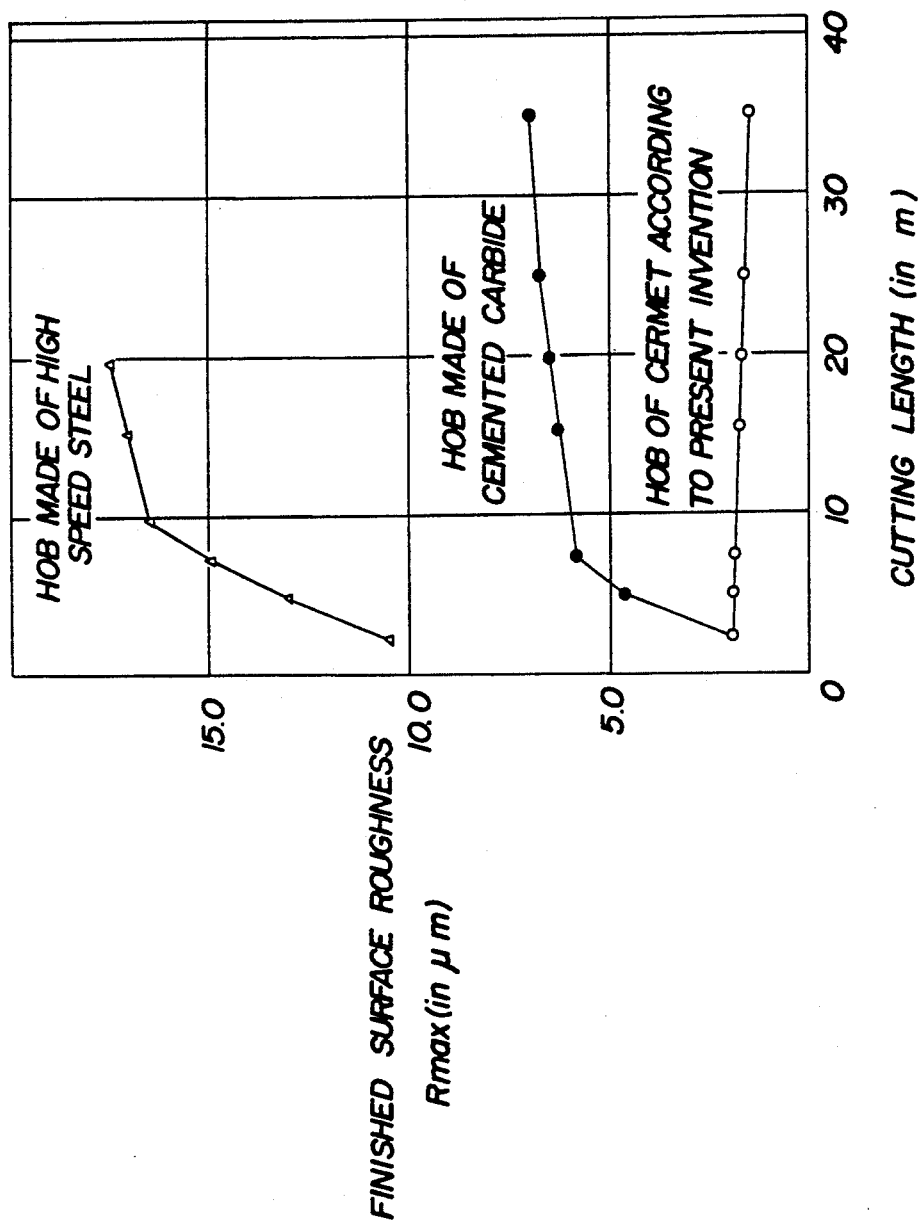
FIG. 4 is a graph showing the results of the experiment on the roughness of the finished surfaces machined by the respective tools.
Figure 5:
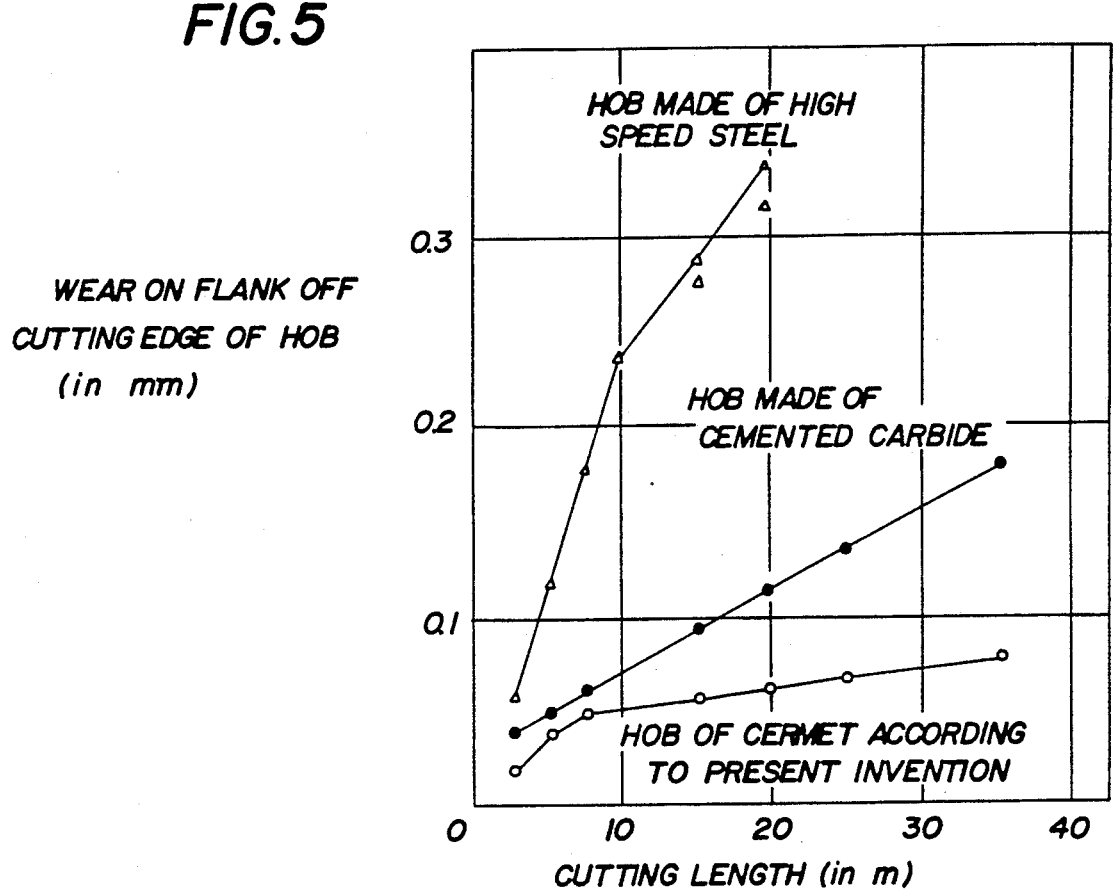
FIG. 5 is a graph showing the results of measurement of the wear on the hobs.

FIG. 4 shows the measurements of the surface roughness of the works machined by the respective hobs versus the cutting length. FIG. 5 shows the degree of wear of the hobs versus the cutting length.

Since the sample No. 4 was extremely difficult to work though sintering was rather easy, it was excluded from the cutting test in view of its economical disadvantage. The samples Nos. 5 and 6 broke instantly upon starting the cutting operation because of poor toughness, making it impossible to measure the surface roughness. Since the samples Nos. 1 to 3 showed similar results to one another, only the results of the sample No. 1 are shown in FIGS. 4 and 5.

FIG. 4 shows that the cermet hob according to the present invention can produce the smoothest finished surface of all the hobs, namely the surface roughness of about 2 microns, whereas the surface roughness values attained by the hobs made of cemented carbide and high-speed steel were 6-7 microns and 16-17 microns, respectively.

As shown in FIG. 5, the cermet hob of the present invention suffered the smallest degree of wear and thus showed the longest service life.

EXPERIMENT II

The hobs made of cermet having the dimensions shown in Table 4 and having the compositions shown in Table 5 were used to machine an alloy steel SCM415 (having an HB of 160) under different cutting conditions as shown in Table 6. The roughness of the finished surface on the material was checked. The measurements of the gear machined are shown in Table 7.

Figure 6:
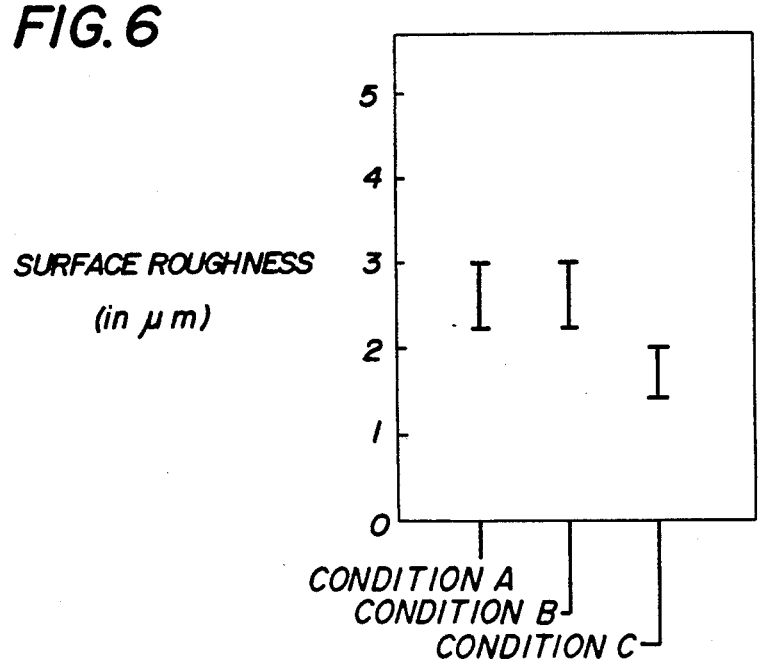
FIG. 6 is a graph showing the roughness of the finished surfaces machined under different machining conditions.

In this experiment, the sample No. 9 showed too high a welding tendency to be acceptable as the material for a hob. Since the samples Nos. 7 and 8 were substantially the same in performance, only the results of the sample No. 7 are shown in FIG. 6, which reveal that the surface finished by the cermet hob according to the present invention had a surface roughness of about 2 microns under any of the three different cutting conditions A to C, that is, the roughness which is so smooth as to require no additional grinding which was necessary with prior art hobs.

If the work is machined with a hob made of cermet having high resistance to weld, the roughhness of the relief surface on each cutting edge is supposed to be transferred precisely onto each tooth of the work. In this experiment, the surface finished by the cermet hob according to the present invention had a roughness of about 2 microns. This is because the relief surface on its cutting edges had a roughness of about 2 microns. This means that the surface roughness of the work is proportional to the surface roughness of the relief surface. But, forming an extremely fine relief surface on each cutting edge will only result in complicating the working of the tool. Thus the lower limit of the roughness of the relief surface should be about 0.5 micron and its upper limit should be about 3 microns, because if the roughness is more than 3 microns, additional grinding will become necessary.

EXPERIMENT III

A hob made of high-speed steel was used for both rough machining and finish machining of a gear. Another gear was machined roughly by use of a hob made of cemented carbide and then finished by use of the hob made of cermet having the same composition as the one used in Experiment I. The machining time, the service life, the surface roughness, etc. were measured for both gears machined.

The gears made of an SCM420 steel (HB 270) were used for testing. Table 8 shows the measurements of the gears. Table 9 shows the results of the experiment and the cutting conditions.

As shown in Table 9, in the prior art process, the machining speed had to be limited to 20 to 30 m/min. in view of the wear of the tools used. The tools withstood the machining of only two gears. Moreover the roughness of the finished surface was 12 S, which is too rough to be acceptable. On the other hand, in the improved process in which a hob made of cemented carbide was used for rough machining and the cermet hob according to the present invention was used for finish machining, it turned out that the machining speed could be increased up to about 100 m/min., thereby greatly improving the machining efficiency. Further the tools used in the improved process exhibited a service life over ten times longer than those of the tools used in the prior art process. The roughness of the finished surface was maintained at about 4.0 S.

TABLE 1

|  | Cermet hob | Hob of cemented carbide | Hob of high speed steel |
|---|---|---|---|
| Specifications of hob |  |  |  |
| Module | 6 | 6 | 6 |
| Pressure angle | 20° | 20° | 20° |
| Lead angle | 2°33′ | 2°33′ | 3°26′ |
| Gash lead | ∞ | ∞ | ∞ |
| Outer dia. | 150 | 150 | 115 |
| Cutting teeth length | 13.500 | 13.500 | 13.500 |
| Type | 1 line clockwise | 1 line clockwise | 1 line clockwise |
| Number of grooves | 18 | 18 | 18 |
| Rake angle | 0° | 0° | 0° |
| Hob accuracy | JIS 0 grade | JIS 0 grade | JIS 0 grade |
| Cutting conditions |  |  |  |
| Speed (m/min) | 94 | 94 | 22.8 |
| Feed (mm/rev) | 1.5 | 1.5 | 1.5 |
| Cutting oil | dry cut | wet | wet |
| Cutting method | conventional | conventional | conventional |
| Finishing stock of one side flank (mm) | 0.2 | 0.2 | 0.2 |
| Accuracy of worked gear | JIS 1st grade | JIS 1st to 2nd grade | JIS 2nd to 3rd grade |

TABLE 2

| Gear specifications | | | |
|---|---|---|---|
| Module | 6 | Pitch circle dia. | 186.000 |
| Pressure angle | 20° | Gear bottom dia. | 171 |
| Number of teeth | 31 | Gear width | 48 mm |
| Outer dia. | 198 | | |

TABLE 3

| Sample No. | Composition Hard phase (Wt %) | Binder metal Ni + Co (Wt %) | N/(C + N) | M/(Ti + M) |
|---|---|---|---|---|
| 1 | (Ti,Ta,W)CN 85 | 15 | 0.41 | 0.12 |
| 2 | (Ti,Ta,W)CN 90 | 15 | 0.35 | 0.3 |
| 3 | (Ti,Ta,W,Zr)CN 83 | 24 | 0.22 | 0.13 |
| 4 | (Ti,Ta,W)CN 85 | 15 | 0.65 | 0.10 |
| 5 | (Ti,Ta,W)CN 80 | 20 | 0.42 | 0.03 |
| 6 | (Ti,Ta,Mo,W)CN 82 | 18 | 0.10 | 0.25 |

Sample Nos. 1, 2 and 3 are the cermets according to the present invention.

TABLE 4

| Hob specifications | | | |
|---|---|---|---|
| Module | 3.0 | Number of line | 1, clockwise |
| Pressure angle | 20° | Lead angle | 1°41′ |
| Outer dia. | 110 | Number of grooves | 14 |

TABLE 5

| Sample No. | Composition Hard phase (Wt %) | Binder metal Ni + Co (Wt %) | N/(C + N) | M/(Ti + M) |
|---|---|---|---|---|
| 7 | (Ti,Ta,Nb,Mo,W)CN 85 | 15 | 0.16 | 0.44 |
| 8 | (Ti,Ta,Nb,Zr,Mo,W)CN 88 | 12 | 0.06 | 0.5 |
| 9 | (Ti,Ta,Nb,Mo,W)CN 85 | 15 | 0 | 0.53 |

Sample Nos. 7 and 8 are the cermets according to the present invention.

TABLE 6

| Cutting conditions | A | B | C |
|---|---|---|---|
| Speed (m/min) | 110.6 | 86.4 | 110.6 |
| Feed (mm/rev) | 1.5 | 1.5 | 1.5 |
| Cutting oil | dry | dry | wet |
| Cutting method | conventional | conventional | conventional |
| Finishing stock (mm) | 0.1 | 0.02 | 0.065 |

TABLE 7

| Gear specifications | | | |
|---|---|---|---|
| Module | 3.0 | Amount of addendum | 1.05 |
| Number of teeth | 22 | Outer dia. | 104 |
| Angle of twist | 0° | | |

TABLE 8

| Gear specifications | | | |
|---|---|---|---|
| Module | 10 | Angle of twist | 20°, right-handed |
| Pressure angle | 20° | Tooth width | 180 |
| Number of teeth | 74 | Outer dia. | 807.49 |

TABLE 9

| | Conventional process | | Process after improved | |
|---|---|---|---|---|
| Process | Rough machining | Finishing | Rough machining | Finishing |
| Hob used | High speed steel hob | High speed steel hob | Cemented carbide hob | Cermet hob |
| Cutting speed (m/min) | 20 | 30 | 80 | 120 |
| Feed (mm/rev) | 1.0 | 2.0 | 1.5 | 2.0 |
| Net cutting time (min/piece) | 488 | | 117 | |
| Tool life (piece/shift) | 2 | 2 | 6 | 22 |
| Finished surface roughness | 12 S | | 4.0 S | |

What is claimed is:

1. A hobbing tool for finishing gears, said tool having a cutting edge made of a cermet comprising 70 to 99 percent by weight of a hard phase, the balance being a binder phase, said hard phase comprising a composite carbonitride including titanium and tungsten and at least one transition metal selected from the group consisting of zirconium, hafnium, vanadium, niobium, tantalum, chromium and molybdenum, said binder phase comprising nickel and/or cobalt and inevitable impurities, the ratio between nitrogen atoms and carbon atoms, that is, $N/(C+N)$, and the ratio between titanium atoms and atoms of a transition metal M other than titanium in the hard phase, that is, $M/(Ti+M)$, meeting one of the following two conditions;
   (a) $N/(C+N)$ is 0.2 to 0.6 whereas $M/(Ti+M)$ is 0.05 to 0.4
   (b) $N/(C+N)$ is 0.05 to 0.25 whereas $M/(Ti+M)$ is 0.4 to 0.6.

2. A hobbing tool as claimed in claim 1, wherein the cutting edge is formed on the flank with a flat land extending in the direction of rotation of the gear.

* * * * *